US011945006B2

(12) United States Patent
Brenne et al.

(10) Patent No.: US 11,945,006 B2
(45) Date of Patent: Apr. 2, 2024

(54) GAS COMPRESSOR CLEANING

(71) Applicant: Equinor Energy AS, Stavanger (NO)

(72) Inventors: Lars Brenne, Sandnes (NO); Svend Tarald Kibsgaard, Porsgrunn (NO); Tor Bjørge, Trondheim (NO); Harald Underbakke, Sandnes (NO)

(73) Assignee: Equinor Energy AS, Stavanger (NO)

(*) Notice: Subject to any disclaimer, the term of this patent is extended or adjusted under 35 U.S.C. 154(b) by 0 days.

(21) Appl. No.: 17/549,073

(22) Filed: Dec. 13, 2021

(65) Prior Publication Data

US 2022/0097104 A1 Mar. 31, 2022

Related U.S. Application Data

(63) Continuation of application No. 16/478,605, filed as application No. PCT/NO2018/050013 on Jan. 17, 2018, now Pat. No. 11,224,900.

(30) Foreign Application Priority Data

Jan. 17, 2017 (GB) .................................... 1700740

(51) Int. Cl.
*B08B 3/04* (2006.01)
*B08B 3/02* (2006.01)
(Continued)

(52) U.S. Cl.
CPC .................. *B08B 3/02* (2013.01); *B08B 3/04* (2013.01); *B08B 9/032* (2013.01); *E21B 43/35* (2020.05); *F04D 29/705* (2013.01); *F17D 1/005* (2013.01)

(58) Field of Classification Search
CPC .... B08B 3/02; B08B 3/04; B08B 9/00; B08B 9/02; B08B 9/027; B08B 9/032;
(Continued)

(56) References Cited

U.S. PATENT DOCUMENTS

| | | | |
|---|---|---|---|
| 9,303,498 | B2 | 4/2016 | Grimseth et al. |
| 2004/0079392 | A1 | 4/2004 | Kuechler et al. |

(Continued)

FOREIGN PATENT DOCUMENTS

| | | | |
|---|---|---|---|
| CN | 202176553 | U | 3/2012 |
| GB | 2017213 | A | 10/1979 |

(Continued)

OTHER PUBLICATIONS

Machine Translation of Ito et al., WO-2016009659-A1, Jan. 2016. (Year: 2016).*

(Continued)

*Primary Examiner* — David G Cormier
(74) *Attorney, Agent, or Firm* — Banner & Witcoff, Ltd.

(57) ABSTRACT

A method of cleaning deposited solid material from a fouled portion of a gas compressor (6) whilst the gas compressor (6) is in situ in a natural gas processing system (1) is provided. The method comprises the steps of supplying a liquid cleaning agent to a gas inlet of the gas compressor (6), the liquid cleaning agent being capable of removing the deposited solid material; passing the liquid cleaning agent through the gas compressor (6) to a gas outlet of the gas compressor (6), wherein at least a portion of the cleaning agent remains in a liquid state as it passes through the fouled portion of the gas compressor (6); and recovering a fluid containing removed material that is output from the gas compressor (6) so as to prevent the removed material reaching one or more gas processing stages of the gas processing system (1) downstream of the gas compressor (6).

4 Claims, 2 Drawing Sheets

(51) Int. Cl.

| | |
|---|---|
| ***B08B 9/032*** | (2006.01) |
| ***E21B 43/34*** | (2006.01) |
| *F04D 29/70* | (2006.01) |
| *F17D 1/00* | (2006.01) |

(58) Field of Classification Search

CPC ... B08B 9/0321; B08B 9/0327; B08B 9/0328; B08B 2209/00; B08B 2209/02; B08B 2209/027; B08B 2209/032; E21B 43/34; E21B 43/36

See application file for complete search history.

(56) References Cited

U.S. PATENT DOCUMENTS

| | | | | |
|---|---|---|---|---|
| 2007/0029091 | A1* | 2/2007 | Stinessen | E21B 43/36 166/357 |
| 2009/0050326 | A1 | 2/2009 | Grynning | |
| 2014/0305539 | A1* | 10/2014 | Stinessen | F17D 5/00 141/1 |
| 2015/0167681 | A1 | 6/2015 | Brenne et al. | |
| 2016/0290366 | A1 | 10/2016 | Brenne et al. | |
| 2019/0374979 | A1 | 12/2019 | Brenne et al. | |

FOREIGN PATENT DOCUMENTS

| | | | | |
|---|---|---|---|---|
| JP | H05141397 | A | 6/1993 | |
| WO | 2007004886 | A1 | 1/2007 | |
| WO | 2009131462 | A2 | 10/2009 | |
| WO | 2010/080040 | A1 | 7/2010 | |
| WO | 2011/066050 | A1 | 6/2011 | |
| WO | 2013185801 | A1 | 12/2013 | |
| WO | WO-2016009659 | A1 * | 1/2016 | E21B 43/12 |
| WO | 2017/004886 | A1 | 1/2017 | |

OTHER PUBLICATIONS

Mar. 8, 2018—(WO) International Search Report and Written Opinion—App PCT/NO2018/050013.

May 5, 2017—(GB) Search Report—APP 1700740.2.

* cited by examiner

GAS COMPRESSOR CLEANING

This Application is a Continuation of U.S. patent application Ser. No. 16/478,605, filed on Jul. 17, 2019, which claims the benefit of priority to and is a US national phase entry pursuant 35 USC 371 of International PCT Patent Application No. PCT/NO2018/050013, which claims the benefit of foreign priority to GB Application No. 1700740.2, filed Jan. 17, 2017, in the United Kingdom. All of the aforementioned patent applications are herein incorporated by reference in their entireties.

The present invention relates to cleaning of a gas compressor to remove the type of fouling deposited during the processing of natural gas, i.e. a mixture of alkanes and unavoidable impurities.

In the oil and gas industry, gas compressors are used during the processing of well fluids to compress the gas to help transport the well fluid from one location to the next. Indeed, it can be necessary to use gas compressors to achieve a sufficiently high rate of production from the well.

In multiphase fluid processing, it is common to remove as much liquid as possible from the gas before the gas is passed through the compressor and compressed. This is because liquid passing through the compressor can cause damage or fouling of the compressor. Processing components located upstream of the compressor may be used to try to reduce or minimise the liquid content in the gas before it reaches the compressor. For example, a multiphase flow may be separated into gas and liquid in a separator.

Preparation of the gas upstream of the compressor may be imperfect, such that the gas entering the compressor may contain some liquid or moisture in very small quantities. High temperatures inside the compressor can cause the liquid entrained in the gas to vaporize away resulting in solids materials such as salts and scale being deposited on surfaces inside the compressor. Often, glycol is added to natural gas during transit from the wellhead to a gas processing facility, and glycol salts are a particularly common form of fouling that occurs in compressors in natural gas processing systems. Solid deposits can detrimentally affect compressor performance and reduce the life time of the compressor.

The most commonly used technique for cleaning a compressor is offline cleaning. The processing system including the gas compressor is shut down and the compressor is physically removed, sent for cleaning and then replaced. For large compressors, this operation can take up to a week, during which time the entire processing system is non-operational. In inaccessible locations, such as subsea or unmanned platforms, offline cleaning can take even longer and is some cases may not be feasible at all.

Online cleaning solutions for compressors have been proposed, such as periodically adding a small quantity of solvent to the gas that is being compressed. An example of such a system is disclosed in WO 2007/004886. The solvent additive passes through the compressor with the gas to clean the interior surfaces. Permanent nozzles and piping systems may be attached to the compressor for supplying this solvent. However, the use of solvent may be costly and may have environmental drawbacks. It may also upset the chemical balance of downstream processing stages.

Another online cleaning solution has been proposed in WO 2013/185801 where a liquid phase stream from downstream of the separator or the multi-phase stream from upstream of the separator are supplied to the compressor inlet so that a large quantity of hydrocarbon liquid is pumped through the compressor. This has been found to clean the compressor to an adequate degree. However, this technique is only applicable to a limited number of situations where the presence of liquid in the compressor output can be tolerated. For example, the gas compressor in WO 2013/185801 is used for boosting a gas stream that will then be re-combined with the liquid phase steam downstream of the compressor.

A need therefore exists for improved techniques for gas compressors cleaning to remove deposits.

Viewed from a first aspect, the present invention provides a method of cleaning deposited solid material from a fouled portion of a gas compressor whilst the gas compressor is in situ in a gas processing system, comprising: supplying a liquid cleaning agent to a gas inlet of the gas compressor, the liquid cleaning agent being capable of removing the deposited solid material; passing the cleaning agent through the gas compressor to a gas outlet of the gas compressor, wherein at least a portion of the cleaning agent remains in a liquid state as it passes through the fouled portion of the gas compressor; and recovering a fluid containing removed material that is output from the gas compressor so as to prevent the removed material reaching one or more gas processing stages of the gas processing system downstream of the gas compressor.

It has been found that adding a relatively small quantity of liquid to the gas stream can effectively remove accumulated solids within the compressor without causing damage the gas compressor. In accordance with this method, a liquid cleaning agent is injected into the gas compressor and removes the deposited solids, which can result in a significant increase in performance. The fluid that is output from the gas compressor containing the removed solids is then recovered from the output of the gas compressor so as to prevent it affecting downstream processing stages.

It is important for the liquid cleaning agent to remain in liquid form as it passes the fouled portion of the compressor. The removal is primarily mechanical, i.e. due to impact from the liquid against the fouling. However, the cleaning agent may also use chemical action to remove the solid material and/or may dissolve the solid material. Once the cleaning agent has passed the fouled portion, it may be allowed to evaporate leaving the solid material flowing in a gas stream. Alternatively, at least a portion of the cleaning agent may remain in liquid form all the way through the gas compressor, e.g. such that a portion of the cleaning agent remains in liquid form at a gas outlet of the gas compressor.

The above method advantageously means that the compressor does not need to be removed from the gas processing system for cleaning, thereby reducing down times. This method also advantageously allows for liquid washing of the compressor to be performed in a system where the gas quality from the compressor is important, for example where the gas is being further processed by one or more downstream processing stages.

Preferably, the gas processing system is a natural gas processing system.

The gas in the compressor of the gas processing system may comprise at least 50 vol. % alkenes, preferably at least 80 vol. % alkanes. In some hydrocarbon gas processing systems, the gas comprises at least 95 vol. % alkanes. In such systems, the gas may comprise substantially alkanes together with unavoidable impurities.

Preferably, the cleaning agent is a hydrocarbon liquid, such as a liquid alkane, or a liquid otherwise produced from a hydrocarbon gas processing system. Hydrocarbon liquids are readily available in hydrocarbon gas processing systems and are effective at removing deposited solids. The hydrocarbon liquid may advantageously also partially dissolve the deposited solids. However, different cleaning agents may be used. For example, the cleaning agent may comprise any of oil, gas condensate, water, glycol, alcohol, or mixtures thereof.

The liquid cleaning agent is preferably mixed with a gas stream being supplied to the gas inlet of the gas compressor. Preferably the mixing comprises mixing the gas stream and the liquid cleaning agent using an ejector.

The liquid cleaning agent is preferably supplied at a pressure higher than that of the gas stream supplied to the inlet to the compressor. Thus, no separate pressurisation of the liquid cleaning agent is required.

Supplying the liquid cleaning agent may comprise opening a cleaning agent supply valve to connect the gas inlet of the gas compressor to a source of liquid cleaning agent. Preferably, the gas processing system is operable when the cleaning agent supply valve is closed. Furthermore, the gas processing system is preferably normally operated with the cleaning agent supply valve closed. That is to say, the cleaning agent supply is preferably not used during normal operation, but is instead preferably only used for a cleaning operation.

The source of liquid cleaning agent may comprises a liquid outlet from a separator located downstream of the gas compressor. This provides a ready source of liquid cleaning agent where the liquid has been already pressurised (by the compressor) relative to the gas being received by the compressor. Furthermore, the liquid is the same liquid as deposited the solids and so may also dissolve the solids again, permitting simpler removal of the solids from the fluid output from the compressor.

The gas processing system may comprise a cooler downstream of the gas compressor and the separator may be downstream of the cooler. The cooler may cool a fluid from the compressor to cause liquids to condense. This cooler means that liquid will be present in the downstream separator. This arrangement is particularly advantageous where the cleaning agent is permitted to vaporise within the compressor as the cooler will subsequently cause liquid condensate to form, which will capture the solid material in the gas stream. Thus, the solid material will be removed with the liquid.

The gas processing system may comprise a separator upstream of the gas compressor, the separator outputting a gas phase output and a liquid phase output, wherein the gas phase output is supplied to the gas compressor during normal operation of the gas processing system.

The gas phase output from the separator is preferably not re-combined with the liquid phase output from the (upstream) separator. That is to say, the system is preferably not a system that separately boosts two-phases and then re-combines the phases. Instead, the method preferably relates to a system where a gas output is required, e.g. for further processing. Preferably, the gas output is quality controlled, i.e. having a liquid content below a predetermined threshold, such as below 1 wt. % and preferably below 0.1 wt. %.

Recovering the fluid output from the compressor may comprise supplying a multiphase output from the gas output of the gas compressor to a separator that outputs a gas phase output and a liquid phase output, the liquid phase output comprising the liquid phase fluid output from the compressor. Preferably substantially all of the fluid output from the compressor is passed to the separator. Thus, all liquid contained in the output of the gas compressor will be removed for the gas stream, thereby preventing it from affecting downstream processing.

The separator may be the separator described above that is upstream of the gas compressor. That is to say, the output from the compressor may be recirculated to upstream of the compressor and a separator upstream. This may be performed using an anti-surge line associated with the compressor. For example, the method may comprise opening an anti-surge valve such that substantially all fluid output from the gas compressor is returned to the separator upstream of the gas compressor.

Preferably the anti-surge line recirculates the output from the compressor to upstream of a cooler, which is upstream of the separator.

In an alternative embodiment, the separator for removing the liquid may be a second separator separate from the separator upstream of the compressor (if present).

In one arrangement, during a cleaning operation, the liquid phase output from the separator downstream of the compressor may be supplied to the gas inlet of the gas compressor. Thus, the liquid cleaning agent may be re-circulated through the compressor multiple times.

At the end of the cleaning operation, the liquid phase output from the separator downstream of the compressor may be drained, for example it may be combined with a liquid phase output from the separator upstream of the compressor. Preferably, the liquid phase output is not supplied to the gas inlet of the gas compressor after completion of the cleaning operation.

The method of cleaning may be a method of online cleaning. That is to say, the process can be performed without shutting down production.

The method of cleaning is preferably performed for a limited period of time.

The limited period of time is preferably less than a day, more preferably less than four hours, more preferably less than one hour, more preferably less than 30 minutes, and most preferably less than 10 minutes.

Preferably, after the limited period of time, the gas processing system resumes normal operation. Preferably, during normal operation, a liquid content in the gas at the gas inlet to the gas compressor is below 5 wt. %, more preferably below 3 wt. % and yet more preferably below 1 wt. %. Preferably, during normal operation, a liquid content in the gas at the gas outlet to the gas compressor is substantially zero.

The method preferably comprises determining the presence or potential presence of a deposit of solid material on the gas compressor, wherein the supplying is preferably performed responsive to said determination. The determination may be performed during normal operation of the gas compressor. For example, operation preferably does not need to be stopped to perform the determination.

The method may comprise measuring a property of a gas at the gas inlet and/or at the gas outlet of the gas compressor, preferably during normal operation of the gas compressor. The measured property of the gas may be used to identify a presence or possible presence of the deposit.

The detecting may comprise identifying a changed performance of the compressor, said changed performance being suggestive of a need for cleaning.

The detecting may comprise comparing a measured property of said fluid or a performance of the gas compressor with a reference value.

In one embodiment, the present invention provides a method of cleaning deposited solid material from a fouled portion of a gas compressor whilst the gas compressor is in situ in a gas processing system, the gas processing system comprising the gas compressor and a separator downstream of the gas compressor, the method comprising: supplying a liquid cleaning agent to a gas inlet of the gas compressor, the liquid cleaning agent being capable of removing the solid material; passing the liquid cleaning agent through the gas compressor to a gas outlet of the gas compressor, wherein at least a portion of the cleaning agent remains in a liquid state as it passes through the fouled portion of the gas compressor; and recovering a fluid containing the removed material that is output from the gas compressor using the separator so as to prevent the liquid cleaning agent reaching one or more gas processing stages of the gas processing system that process a gas phase output of the separator.

In this embodiment, at least a portion of the cleaning agent may remain in liquid form all the way through the gas compressor, e.g. such that a portion of the cleaning agent remains in liquid form at the gas outlet of the gas compressor.

In this embodiment, the method may further comprise recirculating the liquid cleaning agent separated using the separator to the gas inlet of the gas compressor.

In this embodiment, supplying the liquid cleaning agent may comprise opening a supply valve to connect the gas inlet of the gas compressor to a cleaning agent supply line In this embodiment, the recirculating may comprise supplying the liquid cleaning agent separated using the separator to the cleaning agent supply line, preferably at a location upstream of the supply valve.

In this embodiment, the method may further comprise, after completing a cleaning operation, closing the supply valve and opening a drainage valve to drain the liquid cleaning agent In this embodiment, the liquid cleaning agent may be drained to a liquid phase line from a separator in the gas processing system, for example a separator upstream of the gas compressor where a gas phase from the separator is supplied to the gas inlet of the gas compressor.

In another embodiment, the present invention provides a method of cleaning deposited solid material from a fouled portion of a gas compressor whilst the gas compressor is in situ in a gas processing system, the gas processing system comprising the gas compressor, a cooler downstream of the gas compressor and a separator downstream of the cooler, the method comprising: supplying a liquid cleaning agent to a gas inlet of the gas compressor, the liquid cleaning agent being a liquid phase output from the separator and the liquid phase output being capable of removing the solid material; passing the liquid cleaning agent through the gas compressor to a gas outlet of the gas compressor, wherein at least a portion of the cleaning agent remains in a liquid state as it passes through the fouled portion of the gas compressor; and recovering a fluid containing the removed material that is output from the gas compressor using the separator so as to prevent the removed material reaching one or more gas processing stages of the gas processing system that process a gas phase output of the separator.

In this embodiment, the cleaning agent may evaporate after it has passed the fouled portion and before it reaches the gas outlet of the gas compressor. Alternatively, at least a portion of the cleaning agent may remain in liquid form all the way through the gas compressor, e.g. such that a portion of the cleaning agent remains in liquid form at the gas outlet of the gas compressor.

In this embodiment, the supplying may comprise opening a supply valve in a line connecting a liquid phase output of the separator to the gas inlet of the gas compressor In this embodiment, the supply valve may be controlled so as to supply sufficient liquid to the gas inlet of the gas compressor such that at least a portion of the cleaning agent remains in a liquid state at the gas outlet of the gas compressor In yet another embodiment, the present invention provides a method of cleaning deposited solid material from a fouled portion of a gas compressor whilst the gas compressor is in situ in a gas processing system, the gas processing system comprising the gas compressor and a separator having a gas phase output that is supplied to a gas input of the gas compressor, the method comprising: supplying a liquid cleaning agent to the gas inlet of the gas compressor, the liquid cleaning agent being capable of removing the solid material; passing the liquid cleaning agent through the gas compressor to a gas outlet of the gas compressor, wherein at least a portion of the cleaning agent remains in a liquid state as it passes through the fouled portion of the gas compressor; and opening an anti-surge valve associated with the gas compressor such that substantially all fluid output from the gas compressor is returned to a location in the gas processing system upstream of the separator, thereby preventing the removed material that is output from the gas compressor from reaching one or more gas processing stages of the gas processing system downstream of the gas compressor.

Viewed from a second aspect, the present invention provides a gas processing system, comprising: a first separator configured to receive a multi-phase fluid and to produce a gas phase output and a liquid phase output; a gas compressor including a gas inlet and a gas outlet, wherein the gas compressor is arranged to receive the gas phase output from the separator at the gas inlet; a liquid cleaning agent supply line configured to supply a liquid cleaning agent to the gas inlet of the gas compressor; wherein the gas processing system is configured to be operable to recover a fluid output from the gas compressor so as to prevent removed material contained in the fluid from reaching one or more gas processing stages of the gas processing system downstream of the gas compressor.

Preferably, the gas processing system is a natural gas processing system.

The liquid cleaning agent supply line is preferably connected to a source of liquid cleaning agent that is at a pressure higher than that of the gas phase from the separator during operation of the gas processing system.

The liquid cleaning agent supply line is preferably configured to mix the liquid cleaning agent with the gas phase from the separator. The liquid cleaning agent supply line and the gas phase from the separator are preferably connected via an ejector.

The liquid cleaning agent supply line is preferably connected to a source of hydrocarbon liquid. For example, the liquid agent supply line may be connected to a liquid outlet of the first separator and configured to supply the liquid phase output from the first separator to the gas inlet of the gas compressor. Alternatively, or in addition, the liquid cleaning agent supply line may be connected to a liquid outlet from a second separator located downstream of the gas compressor. In this arrangement, the gas processing system may comprise a cooler downstream of the gas compressor and the second separator is downstream of the cooler.

The gas processing system may comprise a cleaning agent supply valve in the liquid cleaning agent supply line configured to control flow of liquid cleaning agent along the liquid cleaning agent supply line.

The gas processing system may be arranged to control the supply valve to supply sufficient liquid to the gas inlet of the gas compressor such that at least a portion of the cleaning agent remains in a liquid state as it passes through a fouled portion of the gas compressor, when performing a cleaning operation. The gas processing system may be arranged to control the supply valve to supply sufficient liquid to the gas inlet of the gas compressor such that at least a portion of the cleaning agent remains in a liquid state at the gas outlet of the gas compressor, when performing a cleaning operation.

Preferably the gas processing system is operable when the cleaning agent supply valve is completely closed. Moreover, the gas processing system is preferably configured to be normally operable with the cleaning agent supply valve closed, i.e. when not in the cleaning mode.

The gas processing system is preferably configured such that the gas phase output from the first separator is not re-combined with the liquid phase output from the first separator.

The gas processing system may be arranged to supply a multiphase output of the gas compressor to an inlet of the separator.

The gas processing system preferably comprises an anti-surge line capable of recirculating substantially all fluid output from the gas compressor to the separator upstream of the gas compressor.

In another arrangement, the gas processing system may comprise a second separator arranged to receive a multi-phase output of the gas compressor that outputs a gas phase output and a liquid phase output, such that the liquid phase output comprising the liquid phase cleaning agent from the gas compressor.

The second separator may be downstream of the gas compressor. The liquid phase output from the separator may be supplied to the gas inlet of the gas compressor. That is to say, the gas processing system may be arranged to re-circulate the liquid cleaning agent through the compressor.

The liquid phase output may alternatively or additionally be arranged to combine the liquid with a liquid phase output from an upstream separator. For example, when the cleaning operation is complete, the liquid cleaning agent may be drained to the liquid phase output of the other separator.

The gas processing system is preferably arranged to permit online cleaning of the gas compressor. That is to say, the process can be performed without shutting down production.

In one embodiment, the present invention provides a gas processing system, comprising: a first separator configured to receive a multi-phase fluid and to produce a gas phase output and a liquid phase output; a gas compressor including a gas inlet and a gas outlet, wherein the gas compressor is arranged to receive the gas phase output from the separator at the gas inlet; a liquid cleaning agent supply line configured to supply a liquid cleaning agent to the gas inlet of the gas compressor; a second separator configured to receive a fluid output from the gas compressor, wherein the second separator is configured to recover a fluid output from the gas compressor so as to prevent removed material contained in the fluid from reaching one or more gas processing stages of the gas processing system downstream of the gas compressor.

In this embodiment, the fluid containing the removed material may be a liquid.

In this embodiment, the gas processing system may be arranged to recirculate the liquid cleaning agent separated using the second separator to the gas inlet of the gas compressor.

In this embodiment, the gas processing system may comprise a supply valve arranged to connect the gas inlet of the gas compressor to the cleaning agent supply line.

In this embodiment, the gas processing system may be arranged to supply the liquid cleaning agent separated using the second separator to the cleaning agent supply line, preferably at a location upstream of the supply valve.

In this embodiment, the gas processing system may be arranged to, after completing a cleaning operation, close the supply valve and open a drainage valve to drain the liquid cleaning agent separated by the second separator. The gas processing system may be arranged to drain liquid cleaning agent to the liquid phase line from the first separator.

In another embodiment, the present invention provides a gas processing system, comprising: a first separator configured to receive a multi-phase fluid and to produce a gas phase output and a liquid phase output; a gas compressor including a gas inlet and a gas outlet, wherein the gas compressor is arranged to receive the gas phase output from the separator at the gas inlet; a cooler configured to receive a fluid output from the gas compressor; a second separator configured to receive a fluid output from the cooler, wherein the second separator is configured to recover fluid output from the gas compressor so as to prevent removed material contained in the fluid from reaching one or more gas processing stages of the gas processing system downstream of the gas compressor; and a liquid cleaning agent supply line configured to supply a liquid cleaning agent to the gas inlet of the gas compressor, the liquid cleaning agent being a liquid phase output from the second separator, In this embodiment, the gas compression system may comprise a supply valve in the liquid cleaning agent supply line connecting a liquid phase output of the separator to the gas inlet of the gas compressor. The gas processing system may be arranged to control the supply valve to supply sufficient liquid to the gas inlet of the gas compressor such that at least a portion of the cleaning agent remains in a liquid state as the cleaning agent passes a fouled portion of the gas compressor, when performing a cleaning operation.

In yet another embodiment, the present invention provides a gas processing system, comprising: a first separator configured to receive a multi-phase fluid and to produce a gas phase output and a liquid phase output; a gas compressor including a gas inlet and a gas outlet, wherein the gas compressor is arranged to receive the gas phase output from the separator at the gas inlet; a liquid cleaning agent supply line configured to supply a liquid cleaning agent to the gas inlet of the gas compressor; and an anti-surge line associated with the gas compressor configured such that, when an anti-surge valve in the anti-surge line is open, substantially all fluid output from the gas compressor is returned to a location upstream of the first separator, wherein the gas processing system is configured, during a cleaning operation, to open the antisurge valve such that substantially all fluid output from the gas compressor is returned to a location in the gas processing system upstream of the separator, thereby preventing the liquid cleaning agent reaching one or more gas processing stages of the gas processing system downstream of the gas compressor.

It should be noted that the anti-surge valve may not need to be fully open in order to enable full recycle flow from the compressor.

The gas processing system may comprise a cooler upstream of the first separator, wherein the anti-surge line returns fluid to a location upstream of the first separator and the cooler.

Certain preferred embodiments of the present invention will now be described in greater detail by way of example only and with reference to the figures, in which.

Figure 1:
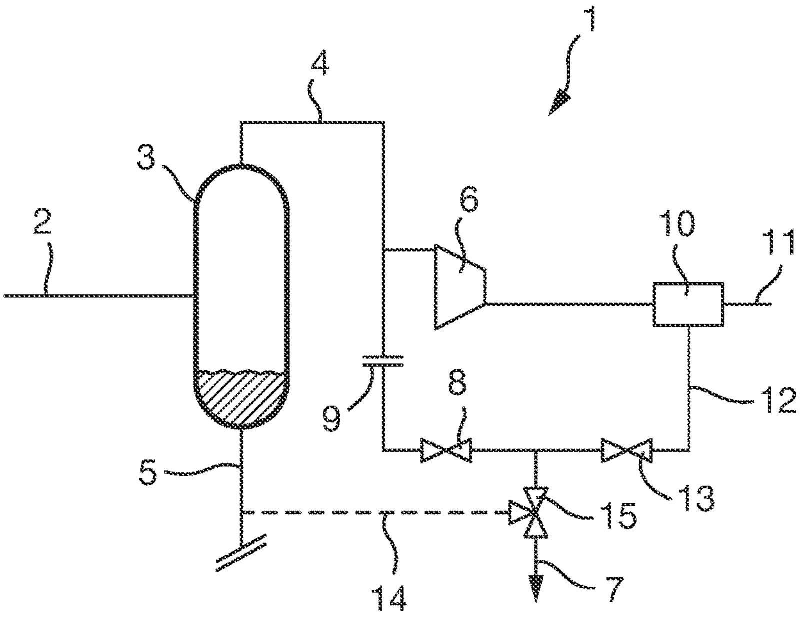
FIG. 1 illustrates a first arrangement for cleaning a gas compressor in a fluid processing system.

With reference to FIG. 1, there is shown a first arrangement for cleaning a gas compressor 6 in a fluid processing system 1 for processing fluids from one or more well(s). In hydrocarbon wells, such fluids may include oil, gas, water, and gas condensate.

The system 1 includes the gas compressor 6 through which gas from the well is passed. The compressor 6 operates to compress the gas, to facilitate transport of the gas onward for further processing downstream of the compressor 6. The compressor 6 has an inlet for intake of the gas to be compressed, and an outlet fluidly connected to the inlet to output compressed gas (not shown). The compressor 6 may have a compressor body extending between the inlet and outlet and defining a flow channel for conveying gas therebetween (not shown). During normal operation, a gas stream is passed into the inlet, through the compressor body, where it is compressed, and out of the outlet.

In this example, the system 1 has a first separator 3 located upstream of the compressor 6. The first separator 3 receives a multiphase fluid from a hydrocarbon well via conduit 2 comprising liquid and gas. The first separator 3 acts to separate gas and liquid from the conduit 2 into a gas stream 4 and a liquid stream 5. The gas phase 4 is supplied to the gas compressor 6.

The system 1 additionally uses a cleaning agent injection apparatus to mix a liquid cleaning agent with the gas stream 4 from the first separator 3. The cleaning agent injection apparatus has a controllable supply valve 8 which may be opened, when required, to fluidly connect a liquid cleaning agent supply line 7 with the gas stream 4, so that liquid cleaning agent from the liquid cleaning agent supply line 6 can be injected into the gas of gas stream 4 so that the gas contains liquid. The liquid cleaning agent may be any cleaning agent suitable for removing the type of solids deposited in the compressor 6 by the vaporisation of the multiphase fluid. Examples of suitable cleaning agents may include liquid hydrocarbons, condensed hydrocarbon gas, a glycol, an alcohol, water, and mixtures thereof.

At the point of mixing with the liquid cleaning agent, the gas stream 4 may be provided with an ejector to accelerate the flow of gas. This may facilitate mixing of the gas with liquid to help control the composition of the fluid entering the compressor 6.

The liquid cleaning agent is supplied at a pressure higher than the gas in the gas stream 4, such that additional pumping is not required. However, a non-return valve 9 may also be located between the liquid cleaning agent supply line 7 and the gas stream 4 to prevent back-flow of the multiphase mixture.

Downstream of the compressor 6 is provided a second separator 10, such as a gas scrubber or the like. The second separator 10 receives fluid output from gas compressor 6. The second separator 10 acts to separate any liquid from the fluid flow to produce a gas stream 11 and a liquid stream 12, such as liquid cleaning agent injected into the compressor 6 by the cleaning agent injecting apparatus. The second separator 10 thus acts to remove any remaining liquid cleaning agent, together with the solid deposits removed from the compressor, which are carried in the liquid.

The gas stream 11 from the second separator 10 should be substantially free from liquid such that the gas may be processed downstream. In particular, the gas stream 11 from the gas processing system 1 is not re-combined with the liquid stream 5.

The liquid stream 12 has a controllable drain valve 13 which may be opened, when required, to drain separated liquid cleaning agent (containing the removed solids) from the second separator 10. The separated liquid cleaning agent may be re-circulated back to the inlet of the compressor 6, or may be drained via the liquid cleaning agent supply line 7 or optionally discharged via a drain line 14 into the liquid stream 5 from the first separator 3. A three-way valve 15, or an equivalent valving configuration, may be provided on cleaning agent supply line 7 and drain line 14 to switch between injection and draining.

During normal operation of the system 1, the supply valve 8 is closed so that liquid cleaning agent is not introduced in to the gas stream 4. The gas stream 4 is received by the compressor 6 and the compressor 6 compresses the gas. The drain valve 13 may also be closed during normal operation.

To initiate a cleaning operation of the system 1, the supply valve 8 is opened and liquid cleaning agent is introduced in to the gas stream 4. The multiphase stream 4 is received by the compressor 6 and the compressor 6 compresses the mixture. A flow measurement device (not shown) may be provided on the injection line downstream the supply valve 8, and preferably downstream of the non-return valve 9, to measure the quantity of liquid cleaning agent supplied to the gas stream 4. The supply valve 8 is controlled so as to supply sufficient liquid cleaning agent to the compressor 6 such that a portion of the liquid cleaning agent remains in liquid form at the outlet of the gas compressor 6.

Typically, the condition of the gas stream upstream and downstream of the compressor 6 and/or the performance of the compressor are monitored. The condition of the gas (e.g. a wet, liquid-containing gas) may be the flow rate, temperature, pressure and/or composition of the gas stream. The performance of the compressor 6 may be calculated based on the increase in pressure or temperature between the inlet and outlet of the compressor. In this example, the monitoring of conditions or performance can be carried out by applying measurement apparatuses (not shown) upstream and downstream of the compressor. The measurement apparatuses may each comprises a multi-phase flow meter and/or a temperature sensor and/or a pressure sensor. The amount of liquid in the gas stream 4 can determined from flow meter measurements. A change in condition of the gas and/or performance of the compressor 6 may indicate that a deposit has formed on a surface inside the compressor 6. For example, this change may be a drop in pressure of compressed gas downstream of the compressor 6. The measured conditions or performance may be compared with previous or expected (modelled) performance.

Detection of fouling may be performed by detecting that the compressor efficiency is reduced compared to the reference value. This is because the compressor's ability to create a pressure increase at a given speed will be be reduced by the fouling. This is especially observed on higher volumetric flow rates. If the presence of a deposit on a surface inside the compressor 6 is detected from measured data, the cleaning operation is initiated as described above.

It will be appreciated that fouling will often occur when the liquid in the gas stream is very low, e.g. when liquid is measured in the gas upstream but not downstream of the compressor. Liquid cleaning agent is then injected into the gas of gas stream 4, such that the gas stream passed into the compressor 6 comprises gas with an amount of liquid entrained therein. As the gas stream 4 passes through the compressor 6, the gas with liquid contained therein acts to remove the detected deposit. Thus, the gas with liquid acts to clean or wash the internal surfaces of the compressor across which the gas is passed. Such surfaces may be surfaces that define the flow channel of the compressor body that come into contact with the gas. In a rotating compressor, these surfaces may include those of a rotating blade.

In order to provide cleaning upon detecting the deposit, the amount of liquid in the gas is made sufficiently great that complete vaporization of the liquid does not occur upon passing the gas through the compressor 6. In other words, the gas needs to remain as a two-phase gas, i.e. a gas with liquid entrained therein, as it enters and exits the compressor 6. If there is insufficient liquid in the gas stream as it enters the compressor, the liquid may vaporise away and deposits may form inside the compressor. The amount of liquid cleaning agent injected is controlled using the supply valve 8. The amount of liquid at the inlet and outlet of the compressor may be monitored using the measurement apparatuses described above.

During the cleaning operation, the drain valve 13 is also open to drain the liquid cleaning agent from the second separator 10. The liquid cleaning agent will continue to circulate from the second separator 10 back to the inlet of the gas compressor 6 because of the pressure difference between the inlet and the outlet of the compressor 6.

Once the deposit has been removed, the valve 8 may be closed to reduce the liquid content in the gas stream, and the compressor 6 can continue to perform at previous or improved performance level, e.g. with no or with the original very low amount of liquid contained in the gas.

Draining of liquid and solids from the second separator 10 can occur by switching valve 15 so the liquid flows under pressure along drain line 14 and is combined with the liquid in liquid line 5 from the first separator 3.

With the deposit removed, the compressor 6 may perform close to an ideal level of performance or of compression. The removal of the deposit may be detectable as an increase in performance, or change in the conditions of the gas upstream or downstream of the compressor back to previous values. Alternatively, removal of the deposit may be assumed to be complete after a predetermined period of cleaning operation. Similar cycles of cleaning may be performed as and when further deposit build-up is detected or suspected.

Upon inserting liquid into the gas stream 4 via valve 8, the system 1 is moved from a condition in which scaling occurs to one in which cleaning occurs. Typically, in order to provide cleaning, the system 1 is arranged such that the liquid content in the gas stream 4 upstream of the compressor 3 is up to around 20 times greater than the liquid content in normal operating conditions where deposits form. Typically, this may be 2 to 20 times greater, but higher amounts may also be feasible.

Gas having a liquid content in an amount of up to around 5% by weight, may result in deposits forming inside the compressor. For example, a typical content of liquid of 0.2% to 0.6% by weight may result in a deposit. In general, it will be appreciated that the amount of liquid required in order to remove deposits from surfaces inside the compressor 6 is dependent on how much liquid evaporates from the gas as it passes through the compressor 6. This is in turn dependent upon the pressure and temperature conditions of the gas.

Computer modelling packages are commercially available to allow processing systems 1 such as that shown in FIG. 1 to be modelled. Such packages can be used to determine the amount of liquid required in the gas supplied to the compressor 6 at the inlet for purposes of cleaning. Flow measurements downstream may verify that the amount supplied is sufficient, and that full vaporisation is not occurring. The models may define relationships between parameters for different parts of the system, including relationships between temperature, pressure and liquid content for a given configuration of processing components and fluids.

Figure 2:
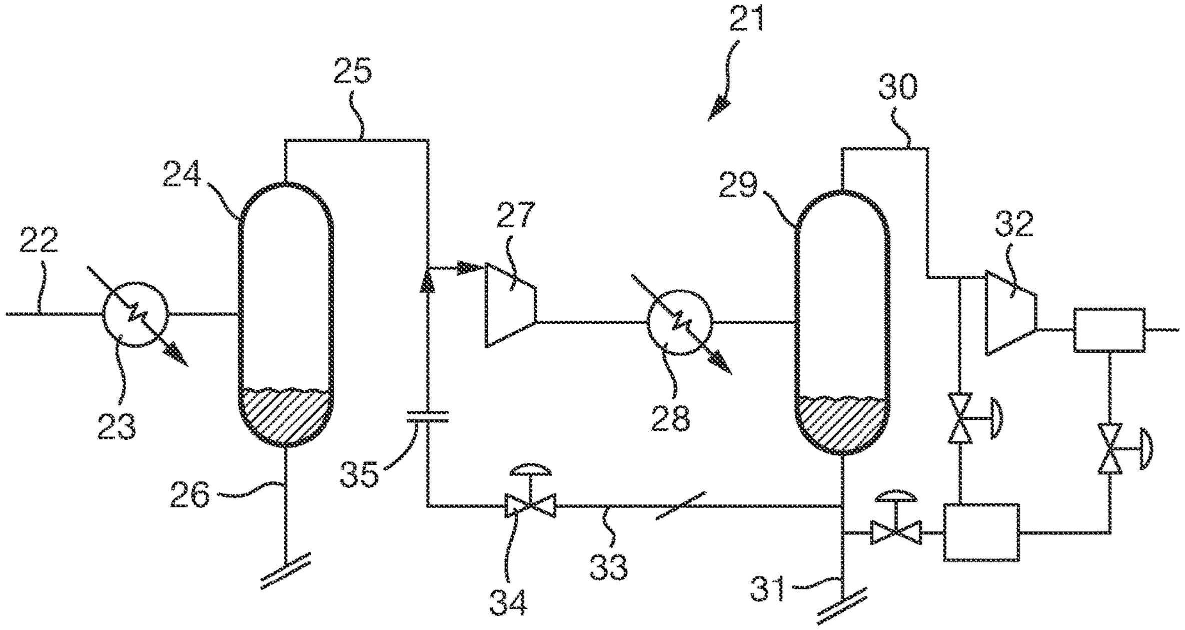
FIG. 2 illustrates a second arrangement for cleaning a gas compressor in a fluid processing system.

With reference to FIG. 2, there is shown a second arrangement for cleaning a gas compressor 27 in a fluid processing system 21 for processing fluids from a well.

The system 21 includes the gas compressor 27 through which gas from the well is passed and first separator 24 located upstream of the compressor 27. The compressor 27 and first separator 24 are structurally and operationally equivalent to the compressor 6 and first separator 3 shown in FIG. 1. The gas compressor 27 is also monitored by equivalent measurement apparatuses to detect fouling.

This system 21 again uses a cleaning agent injection means to mix a liquid cleaning agent with the gas stream 25 from the first separator 24. However, the cleaning agent injecting apparatus in the system 21 shown in FIG. 2 is different from that in the system 1 shown FIG. 1.

In system 21, a cooler 28 is provide downstream of the compressor 27 to cool the gas output from the compressor 27. This causes liquid hydrocarbons to condense, providing a multi-phase gas stream. This multi-phase gas stream is supplied to a second separator 29. The second separator 29 receives the multiphase fluid and acts to separate gas and liquid from the fluid into a gas stream 30 and a liquid stream 31.

The gas stream 30 from the second separator 29 is passed onwards for downstream processing. For example, as illustrated, the gas stream 30 may be compressed by a second compressor 32. In FIG. 2, the second compressor 32 is illustrated including a cleaning agent injection apparatus similar to that shown in FIG. 1, and the details thereof are not repeated.

The liquid stream 31 from the second separator 29 is drained for disposal or other processing. However, a liquid supply line 33 connects to the liquid stream to divert at least a portion of the liquid stream for use as a liquid cleaning agent to clean the first compressor 27 during a cleaning operation.

In system 21, the cleaning agent injection system has a controllable supply valve 34 which may be opened, when required, to fluidly connect the liquid supply line 33 to the gas stream 25 from the first separator 24, so that liquids from the liquid supply line 33 can be injected into the gas of gas stream 25 so that the gas contains liquid.

At the point of mixing with the liquid, the gas stream 25 may be provided with an ejector to accelerate the flow of gas. This may facilitate mixing of the gas with liquid to help control the composition of the fluid entering the compressor 27.

The liquid from the liquid supply line 33 is at a pressure higher than the gas in the gas stream 4 because it is downstream of the gas compressor 27. However, as described above, a non-return valve 35 may also be located between the liquid supply line 33 and the gas stream 25 to prevent back-flow of the multi-phase mixture.

During normal operation of the system 21, the supply valve 34 is closed so that liquid from the liquid stream 31 is not introduced in to the gas stream 25. The gas stream 25 is received by the compressor 27 and the compressor 27 compresses the gas.

To initiate a cleaning operation of the system 21, the supply valve 34 is opened and liquid is introduced in to the gas stream 27. The multiphase stream 25 is received by the compressor 27 and the compressor 27 compresses the mixture. The supply valve 34 is controlled so as to supply sufficient liquid cleaning agent to the compressor 27 such that a portion of the liquid remains in liquid form at the outlet of the gas compressor 27.

A flow measurement device (not shown) may be provided on the injection line 33 downstream the supply valve 34, and preferably downstream of the non-return valve 35, to measure the quantity of liquid cleaning agent supplied to the gas stream 25. The cleaning operation of the compressor 27 in FIG. 2 is monitored and controlled in the same manner as the cleaning operation of the compressor 6 in FIG. 1, and details thereof are not repeated. As with the system 1 shown in FIG. 1, the system 21 shown in FIG. 2 is an online cleaning process.

Figure 3:
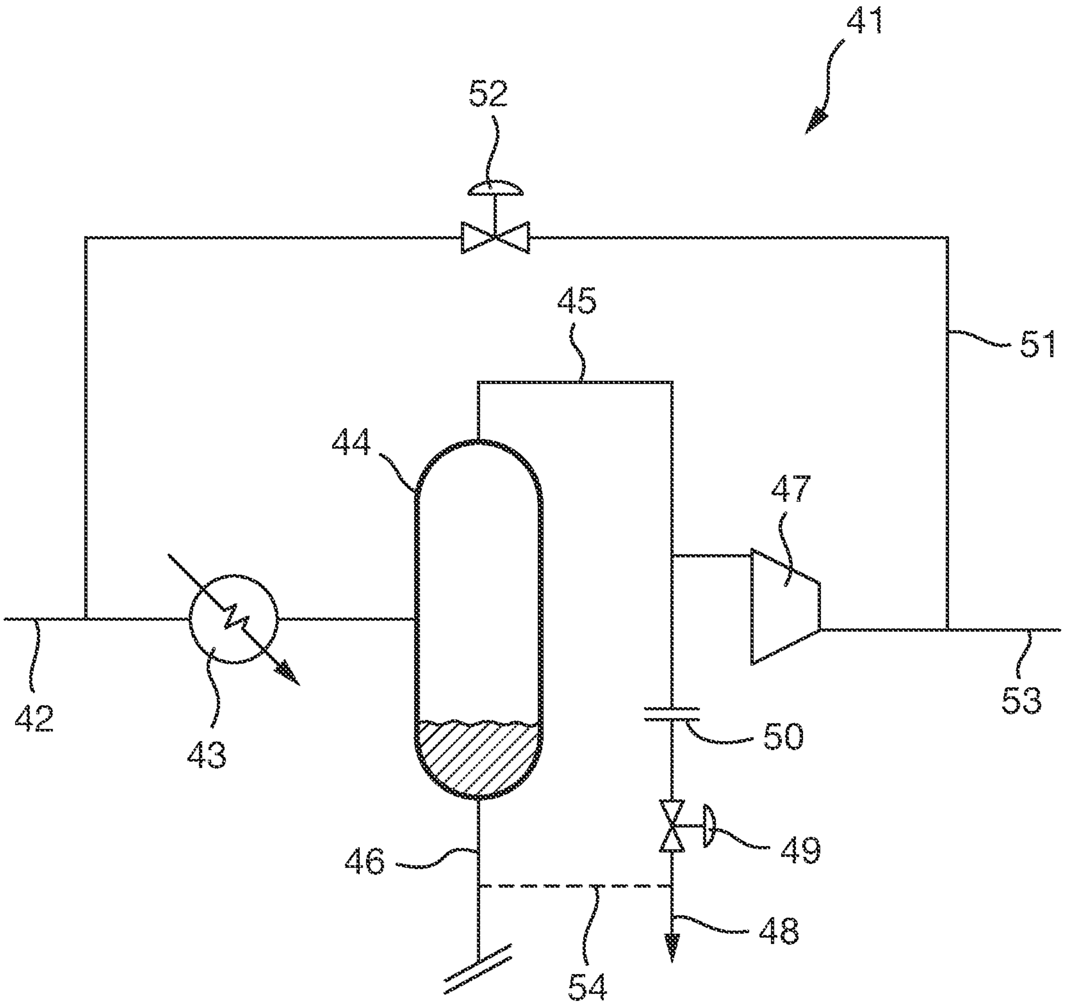
FIG. 3 illustrates a third arrangement for cleaning a gas compressor in a fluid processing system.

With reference to FIG. 3, there is shown a third arrangement for cleaning a gas compressor 47 in a fluid processing system 41 for processing fluids from a well.

The system 41 includes the gas compressor 47 through which gas from the well is passed and first separator 44 located upstream of the compressor 47. The compressor 47 and first separator 44 are structurally and operationally equivalent to the compressor 6 and first separator 3 shown in FIG. 1. The gas compressor 47 is also monitored by equivalent measurement apparatuses to detect fouling.

This system 41 further comprises a cleaning agent injection means to mix a liquid cleaning agent with the gas stream 45 from the first separator 44. The cleaning agent injecting apparatus in the system 41 shown in FIG. 3 is structurally similar to the cleaning agent injecting apparatus in the system 1 shown FIG. 1. That is to say, in system 41, the cleaning agent injection system has a controllable supply valve 49 which may be opened, when required, to fluidly connect a liquid cleaning agent supply line 48 to the gas stream 45 from the first separator 44, so that liquids from the liquid supply line 33 can be injected into the gas of gas stream 25 so that the gas contains liquid. As above, the liquid cleaning agent may be at a higher pressure than the gas stream 45 and an ejector may be used to facilitate mixing of the gas with the liquid.

The liquid phase output from liquid stream 46 may be supplied to the cleaning agent supply line 48 via a liquid supply line 54. Optionally, a pump (not shown) may be used, e.g. in the liquid supply line 54, to pressurise the liquid phase from stream 46. In such an embodiment external source of cleaning fluid may not be required.

The system 41 shown in FIG. 3 differs from the system 1 shown in FIG. 1 in that it does not use a second separator 10 downstream of the compressor 44 to remove the liquid in the fluid output from the compressor. Instead, during the cleaning operation, the system 41 in FIG. 3 fully opens an anti-surge valve 52 in an anti-surge line 51 associated with the compressor 47. When (fully) opened, substantially all of the fluid output from the compressor 47 is re-circulated back to a location within the system 41 that is upstream of the first separator 44.

During normal operation of the system 21, the supply valve 34 is closed so that liquid cleaning agent from the liquid cleaning agent supply line 48 is not introduced in to the gas stream 45. The gas stream 45 is received by the compressor 47 and the compressor 47 compresses the gas.

The anti-surge valve 52 may be operated during normal operation of the compressor so as to regulate the output from the system 41. Anti-surge lines 51 are commonly used in most compressor systems to account for varying demand. As such, the system 41 shown in FIG. 3 requires less substantial modification than the systems 1, 21 shown in FIGS. 1 and 2 to retrofit into an existing fluid processing system.

Optionally, the system 41 may be provided with a valve on the outlet line 53. If such a valve is included, it may be closed during the cleaning operation to ensure that all of the fluid from the compressor 47 is recirculated. Optionally, a valve on the inlet line 42 may also be provided, which may similarly be closed during the cleaning operation.

To initiate a cleaning operation of the system 41, the supply valve 49 is opened and liquid cleaning agent is introduced in to the gas stream 45. At the same time, the anti-surge valve 52 is opened sufficiently such that substantially all fluid output from the compressor 47 is re-circulated to upstream of the first separator 44.

The multiphase stream is received by the compressor 47 and the compressor 47 compresses the mixture. The supply valve 49 is controlled so as to supply sufficient liquid cleaning agent to the compressor 47 such that a portion of the liquid remains in liquid form at the outlet of the gas compressor 47. The multi-phase fluid output from the compressor 47 is re-circulated to upstream of the first separator 44, thus preventing the liquid cleaning agent from affecting any gas processing steps downstream of the compressor 47.

The cleaning operation of the compressor 47 in FIG. 3 is monitored and controlled in the same manner as the cleaning operation of the compressor 6 in FIG. 1, and details thereof are not repeated.

In the system 41 of FIG. 3, all of the fluid from the compressor 47 is re-circulated and thus gas production is temporarily suspended during the cleaning operation. However, since the cleaning operation can be carried out in situ, the down time is relatively short compared to removing the compressor from the system 41.

In practice, a gas compressor 6, 27, 47 will often comprise multiple stages. Since the liquid content of the gas received at the gas inlet to the gas compressor 6, 27, 47 is typically maintained at very low levels, any liquid will often evaporate in the first few stages of the gas compressor 6, 27, 47. As a result, fouling due to evaporation of the liquid often occurs predominantly in a portion at the inlet to the gas compressor 6, 27, 47

The preferred embodiments describe a full clean in which the liquid cleaning agent is supplied in sufficient quantity such that it remains in a liquid state at the gas output of the gas compressor 6, 27, 47. However, this may not always be necessary and partial cleaning of the gas compressor 6, 27, 47 may be sometimes be sufficient. To achieve this, only sufficient liquid cleaning agent needs to be added such that it remains in a liquid phase as it passes through the fouled portion of the gas compressor 6, 27, 47. The removed solids which have been displaced will then be carried in the gas stream.

When the gas and vaporised cleaning agent leave the gas compressor 6, 27, 47, a downstream cooler (cooler 28 or cooler 43 in FIGS. 2 and 3, or optionally a cooler may be added upstream of separator 10 in FIG. 1) will condense a portion of the gas and the removed solids will become entrained in this condensate, which is removed by the respective separator.

The invention claimed is:

1. A natural gas processing system, comprising:

a first separator configured to receive a multi-phase hydrocarbon fluid and to produce a gas phase output and a liquid phase output;

a gas compressor including a gas inlet and a gas outlet, wherein the gas compressor is arranged to receive the gas phase output from the first separator at the gas inlet;

a liquid cleaning agent supply line configured to supply a liquid cleaning agent to the gas inlet of the gas compressor; and a second separator arranged to receive a fluid output from the gas compressor, wherein the second separator is configured to recover the fluid output from the gas compressor so as to prevent removed deposited solid material contained in the fluid output from the gas compressor from reaching one or more gas processing stages of the natural gas processing system downstream of the gas compressor, the second separator being arranged to output a gas phase output and a liquid phase output, such that the liquid phase output from the second separator contains deposited solid material removed from the gas compressor, wherein the gas processing system is configured to, during a cleaning operation, supply the liquid phase output from the second separator to the gas inlet of the gas compressor via the liquid cleaning agent supply line.

2. The natural gas processing system according to claim 1, wherein the liquid cleaning agent supply line is connected to a source of liquid cleaning agent that is at a pressure higher than that of the gas phase from the first separator during operation of the natural gas processing system.

3. The natural gas processing system according to claim 1, further comprising:

a cooler arranged between the gas outlet of the gas compressor and a multiphase fluid inlet of the second separator.

4. The natural gas processing system according to claim 1, wherein the gas processing system is arranged to supply sufficient liquid to the gas inlet of the gas compressor such that at least a portion of the cleaning agent remains in a liquid state as it passes through at least a fouled portion of the gas compressor, when performing a cleaning operation.

* * * * *